US006891935B1

(12) United States Patent
Bresemann et al.

(10) Patent No.: US 6,891,935 B1
(45) Date of Patent: May 10, 2005

(54) DIRECT ACCESS ARRANGEMENT (DAA) CIRCUIT HAVING AUTOMATIC INTERFACE IDENTIFICATION

(75) Inventors: David P. Bresemann, Austin, TX (US); Robert C. Wagner, Austin, TX (US); David C. Andreas, Austin, TX (US); Xun Yang, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 10/737,110

(22) Filed: Dec. 16, 2003

(51) Int. Cl.$^7$ ............................................. H04M 11/00
(52) U.S. Cl. ............................. 379/93.05; 379/93.29; 379/93.37; 379/399.01; 375/222
(58) Field of Search .................... 379/93.05–93.07, 379/93.28–93.37, 90.01, 399.01, 399.02, 413.02; 375/222

(56) References Cited

U.S. PATENT DOCUMENTS

| | | | | | |
|---|---|---|---|---|---|
| 4,868,863 | A | * | 9/1989 | Hartley et al. ............ | 379/93.07 |
| 6,091,806 | A | * | 7/2000 | Rasmus et al. ........... | 379/93.29 |
| 6,128,373 | A | * | 10/2000 | Mathe et al. ............. | 379/93.29 |
| 6,201,865 | B1 | * | 3/2001 | Dupuis et al. ............ | 379/393 |
| 6,304,597 | B1 | | 10/2001 | Dupuis et al. | |
| 6,351,530 | B1 | * | 2/2002 | Rahamim et al. ....... | 379/399.01 |
| 6,359,973 | B1 | * | 3/2002 | Rahamim et al. ........ | 379/93.05 |
| 6,385,235 | B1 | | 5/2002 | Scott et al. | |
| 6,510,215 | B1 | | 1/2003 | Hendrickson | |
| 6,748,515 | B1 | | 6/2004 | Hendrickson et al. | |

OTHER PUBLICATIONS

Google search results for azalia specification revision 0.7, dated Aug. 26, 2004.*
Intel Press Release, "Intel Announces Name of Next–Generation Audio Specification," 1 pg., Jan. 9, 2004.
Silicon laboratories, "Si3038—Glo9bal MC'97 Silicon DAA" Rev. 2.01, Sep. 2001, pp. 1–64.
Intel Corporation, "Audio Codec '97" Rev. 2.1, May 22, 1998, pp. 1–108.
Intel, "High Definition Audio Specification" Rev. 1.0, Apr. 15, 2004, pp. 1–174.
Copending U.S. patent application Ser. No. 09/617,465, filed Jul. 17, 2000, "Telephone Ring–Validation and Wake–On–Ring Circuitry and Associated Methods" (SILA:062).
Copending U.S. patent application Ser. No. 09/617,079, filed Jul. 17, 2000, "Telephone Hang–Up Timeout Circuitry and Data Timeout Circuitry For Electronic Devices and Associated Methods" (SILA:064).
Copending U.S. patent application Ser. No. 09/617,405, filed Jul. 17, 2000, "Data–Security Circuitry for Electronic Devices and Associated Methods" (SILA:065).
Copending U.S. patent application Ser. No. 10/190,136, filed Jul. 3, 2002, "Resistor Identification Configuration Circuitry and Associated Method" (SILA:094).

* cited by examiner

Primary Examiner—Wing F. Chan
(74) Attorney, Agent, or Firm—O'Keefe, Egan & Peterman, LLP (57) ABSTRACT

A technique is provided for an electrical device to automatically detect one of a plurality of interface standards to operate in accordance with. More particularly, a direct access arrangement (DAA) for communicating with telephone lines is provided for utilization with modem communications over a phone line. The DAA may be configured to automatically detect and operate in accordance with a plurality of interface standards for communications to a host system. For example, the DAA may detect that communications are to be provided in accordance with the AC-97 interface standard or the Azalia interface standard. In one embodiment, a clock signal may be monitored to determine the proper interface mode. In another embodiment, the automatic detection of the proper interface mode may be accomplished by monitoring the data presented to the DAA through the interface standard.

48 Claims, 5 Drawing Sheets

DIRECT ACCESS ARRANGEMENT (DAA) CIRCUIT HAVING AUTOMATIC INTERFACE IDENTIFICATION

TECHNICAL FIELD OF THE INVENTION

This invention relates generally to techniques for connecting to communication networks and more particularly to circuits utilized to connect modems to telephone line networks.

BACKGROUND

Direct access arrangement (DAA) circuitry is often utilized to connect electrical systems to telephone networks such as the POTS network. Thus, the DAA circuitry provides the necessary circuitry that enables communication between an electrical system and the standard two wire phone line.

Figure 1:
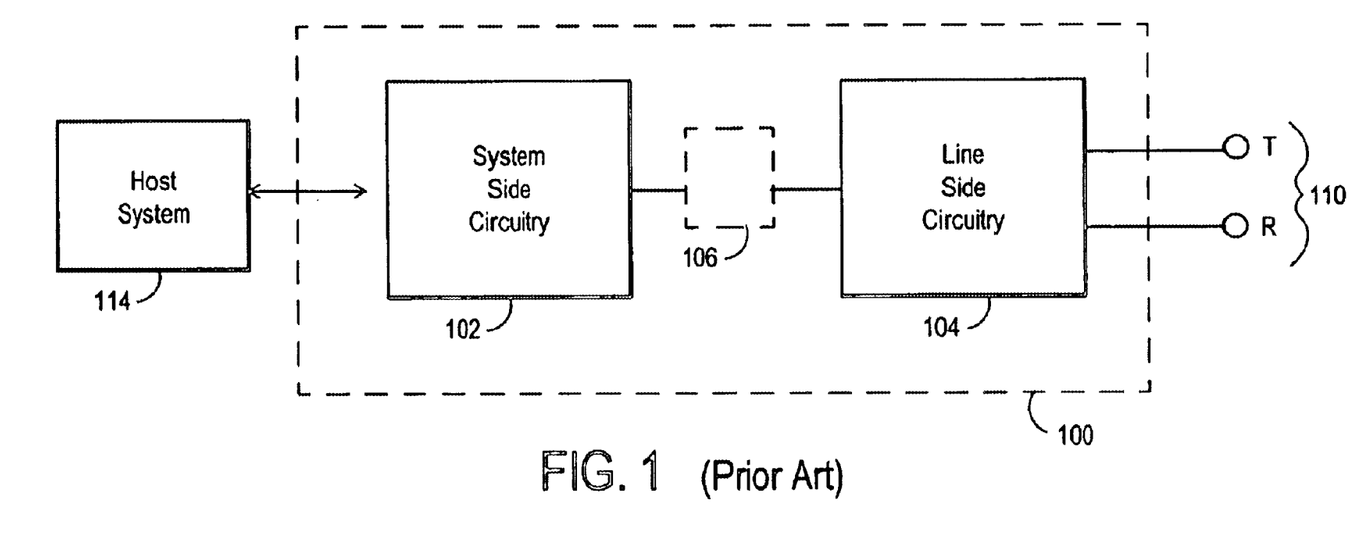
FIG. 1 is block diagram of a DAA and host system.

As shown in FIG. 1, DAA circuitry 100 is utilized provide a communication channel from the TIP and RING phone lines 110 and a host system 114. The host system 114 may be any of a wide range of electrical systems, and may be for example, a personal computer, a laptop computer, a set-top box, or other electrical devices. The DAA circuitry 100 may include an isolation barrier 106. The isolation barrier 106 provides the electrical isolation required by various governmental standards for isolation between the telephone line network and electrically powered circuitry. Example isolation barriers may include for example, capacitors, transformers, opto-couplers and/or any other devices that provide the required isolation. The DAA circuitry may also include system side circuitry 102 and line side circuitry 104. The system side circuitry may include integrated circuits and/or discrete devices that are located on the system side of the isolation barrier 106. The line side circuitry may include integrated circuits and/or discrete devices that are located on the telephone line side of the isolation barrier 106. Exemplary prior art DAA circuitry is shown in U.S. Pat. Nos. 6,385,235 and 6,304,597, the disclosures of which are each incorporated herein by reference.

The system side circuitry 102 may communicate with the host system 114 through a communication interface 116. The communication interface 116 may provide data and control information between the host system 114 and the DAA circuitry 100. In one exemplary application, the host system may include dedicated modem hardware. Such modem hardware provides the necessary modem data processing to communicate data from a host system across a phone line. In another exemplary application the host system may include a "soft" modem. A soft modem is implemented by utilizing system hardware resources (such the CPU of a personal computer) in conjunction with modem software that runs on the host system in order to provide the necessary modem functionality. In another exemplary application, the modem functionality may be performed within the system side circuitry 102.

No matter what type of modem is implemented, the DAA circuitry generally must be configured in a manner such that it is compatible with the communication interface standard utilized by the host system 114. Exemplary communication interface standards that the communication interface 116 may be in compliance with include for the Peripheral Component Interconnect (PCI) standard, the AC-97 standard, the Azalia standard, and others interfaces. The PCI standard is a common I/O bus standard that is well known in the art that provides a shared data path between processors and peripheral controllers. To provide a standard interface for computer system audio applications, Intel Corporation has sponsored the Audio Code '97 (AC-97) Component Specification. Note that, as used here, AC-97 operational specifications include the current AC-97 operational specifications and any revisions or updates to those specifications, as well as any follow-on specifications that incorporate features of the current AC-97 operational specifications. The Audio CODEC '97 Component Specification, revision 2.1 (May 22, 1998) is hereby incorporated by reference in its entirety. The AC-97 specifications enable a controller residing in a computer system to communicate with a variety of devices, including telecommunication devices through a TDM interface such as a five wire TDM interface. Some of those telecommunication devices, for example, data modems, may use telephone lines to communicate with other devices and exchange data. The Azalia standard is an upgrade of the AC-97 also sponsored by Intel Corporation. The Azalia standard provides a five wire interface as with the AC-97 standard, however, the Azalia interface is based upon a packet based protocol rather than a TDM based protocol. The Azalia Specification revision 0.7 is hereby incorporated by reference in its entirety. In prior art DAA solutions, the DAA circuitry is typically configured with a dedicated interface that operates with only one interface standard. For example, the Silicon Laboratories Si3038 product is a DAA that has an interface that complies with the AC-97 specification (the datasheet for the Si3038 is expressly incorporated herein by reference).

Figure 1A:
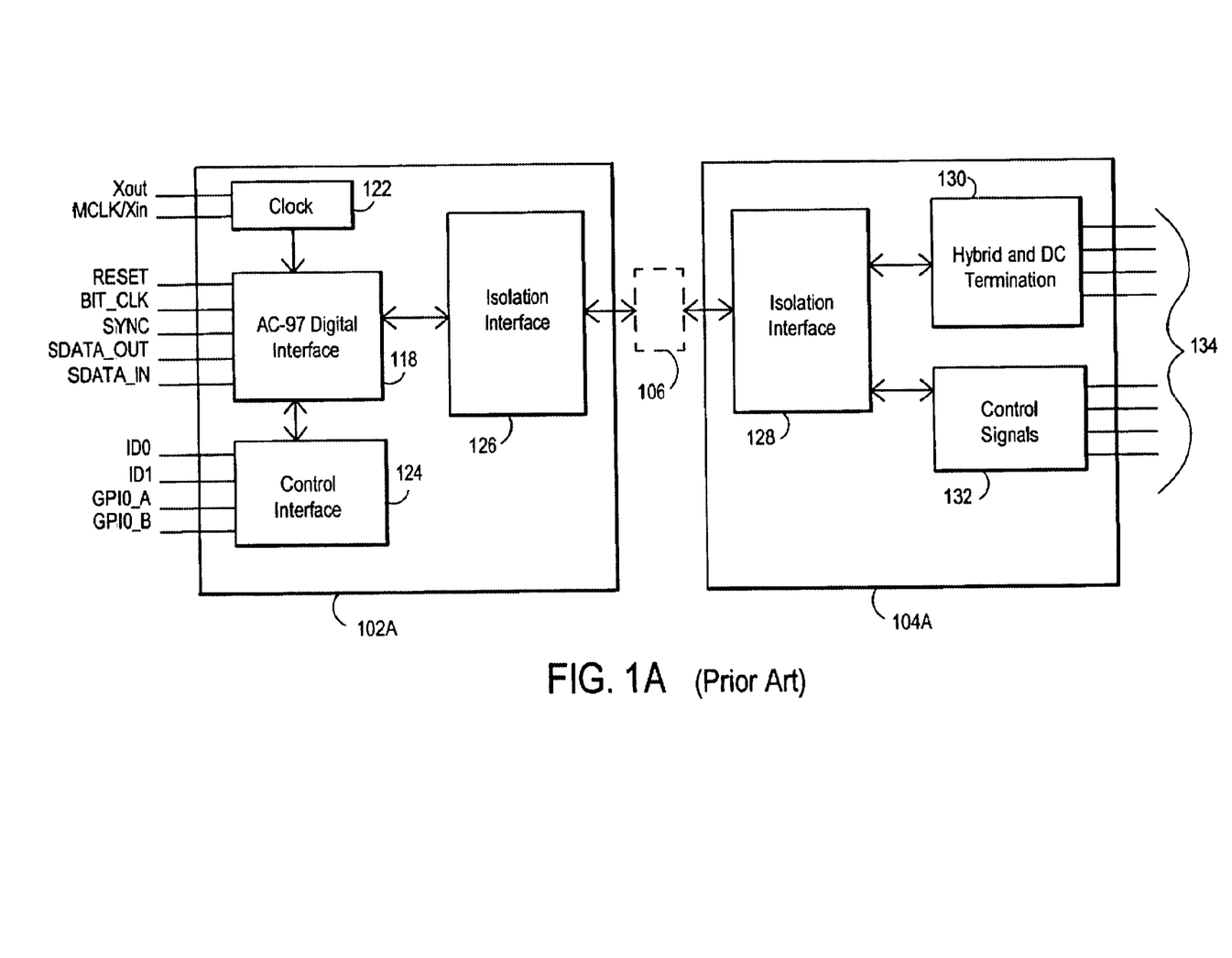
FIG. 1A is block diagram of a prior art DAA.

FIG. 1A provides a block diagram of an exemplary DAA configured to operate with the AC-97 interface standard. As shown in FIG. 1A, a system side integrated circuit 102A may include clock circuitry 122, AC-97 digital interface circuitry 118, and control interface 124. An isolation interface 126 may also be provided. The line side integrated circuit 104A may include an isolation interface 128, hybrid and dc termination circuitry 130 and control signal circuitry 132 (such as ring detect circuitry, off-hook detect circuitry, etc.). A plurality of lines 134 may couple the line side integrated circuit 104A to discrete components that are used to couple the line side integrated circuit to the TIP and RING phone lines of a phone line network. An isolation barrier 106 may be provided between the line side integrated circuit 104A and the system side integrated circuit 102A. The isolation barrier 106 provides the electrical isolation of the phone line network as required by various U.S. and foreign governmental and international bodies and/or standards, such as for example as required by the FCC.

To accommodate an interface standard, the DAA circuitry 100 is generally hardwired or hard programmed to operate with a single known interface standard. It would be desirable to implement a DAA that may operate with a plurality of interface standards.

SUMMARY OF THE INVENTION

In one embodiment, the present invention provides a technique for an electrical device to automatically detect one of a plurality of interface standards to operate in accordance with. More particularly, a DAA is provided for utilization with modem communications over a phone line. The DAA may be configured to automatically detect and operate in accordance with a plurality of interface standards for communications to a host system. For example, the DAA may detect that communications are to be provided in accordance with the AC-97 interface standard or the Azalia interface standard.

In one embodiment, the clock signal may be monitored. The frequency of the clock may then be utilized to determine which interface standard the DAA should operate in accordance with. In another embodiment, the automatic detection of the interface standard may be accomplished by monitoring the data presented to the DAA through the interface standard. For example, the number of bit clocks provided across the interface during a frame SYNC signal ("SYNC") may be counted to determine which interface standard the DAA should operate in accordance with.

DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION OF THE INVENTION

Figure 2:
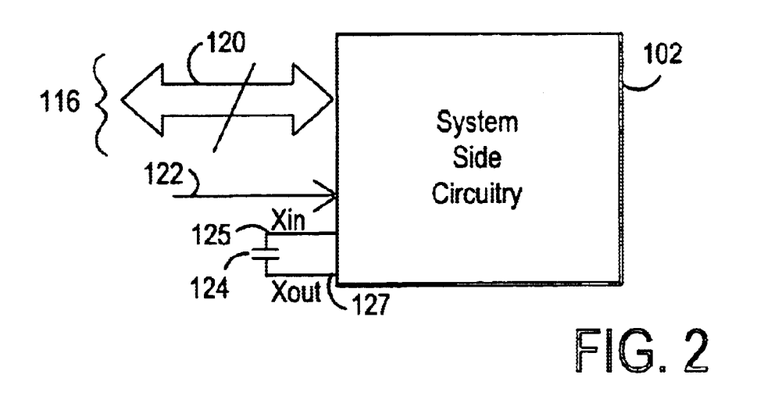
FIG. 2 is block diagram of a DAA system side circuit having a programmable interface and clock inputs.

One embodiment of the system side circuitry 102 of FIG. 1 is shown in more detail in FIG. 2. As shown in FIG. 2, the system side circuitry 102 may communicate with the host system main bus through a communication interface 116. The communication interface 116 may be configured for any of a wide variety of interface standards as discussed above. Typically the interface is configured as a multi-line bus connection as shown by communication interface lines 120. Information provided across the communication interface may be input data, output data, clocking information, synchronization information, reset triggers, etc. as is known in the art. Generally, in addition to communication with the host system main bus through the communication interface 116, the DAA also may receive a master clock from the system. As shown in FIG. 2, at least one clock line 122 may be provided to provide a clock signal to the system side circuitry 102. Alternatively, rather than providing a clock signal via a clock line 122, the clock source may be a crystal oscillator 124 that provides a clock signal to the system side circuitry 102 at nodes Xin and Xout through lines 125 and 127. In one embodiment, the system side circuitry may be fully integrated within a single integrated circuit and the communication interface lines 120, clock line 122 and the crystal oscillator Xin and Xout nodes are provided to separate pins of the integrated circuit. The node for the clock line 122 may be shared with the Xout node. Though not shown, the system side circuitry 102 may also communicate with the system through other pins that provide functionality such as device ID, general purpose I/O, etc.

As shown in FIG. 2, the system side circuitry 102 is shown to receive a clock signal from either a clock line 122 or a crystal oscillator 124. However, the system side circuitry 102 need not be constructed to receive the clock signal from both sources but rather the system side circuitry 102 may also be constructed in a manner that the clock signal is only receive from the clock line 122 or only received from the crystal oscillator 124.

Figure 3:
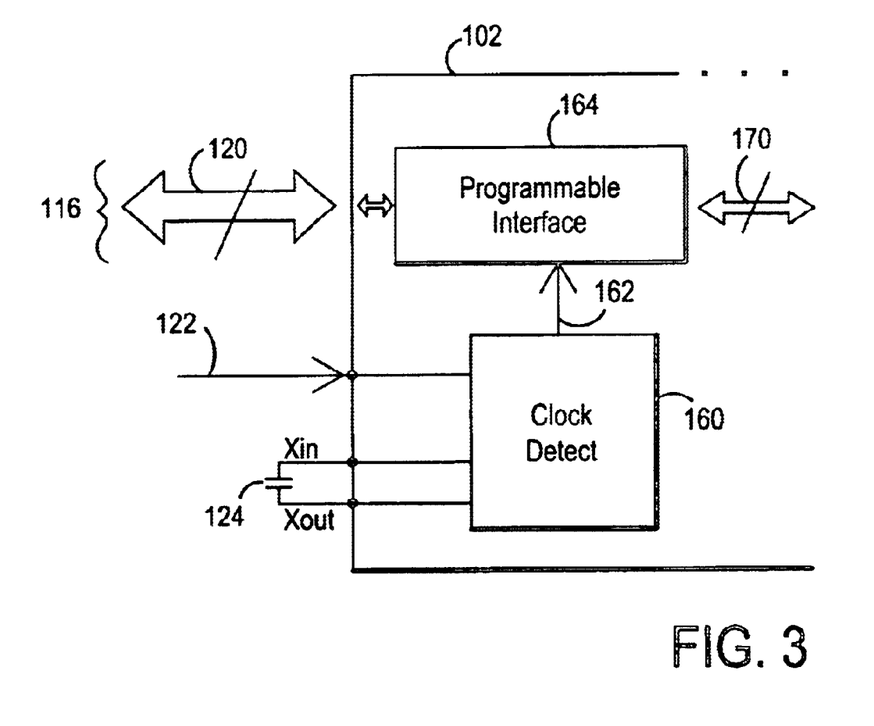
FIG. 3 is a block diagram of a DAA system side circuit having circuitry to detect an input clock frequency.

As shown in FIG. 3, the system side circuitry 102 may also include a programmable interface 164 that transmits and receives data to and from the communication interface lines 120. The programmable interface 164 may then provide the data to and from the rest of the system side circuitry 102 through lines 170 in order to provide the data to and from the line side circuitry 104 across an isolation barrier 106. The programmable interface 164 may be interface circuitry that is programmable to operate in a plurality of modes. For example, the programmable interface circuitry 164 may receive and transmit data in accordance with two or more interface standards. In one embodiment, the programmable interface circuitry 164 may be operable in an AC-97 mode or in an Azalia mode of operation. Though described with relationship to switchable operations between AC-97 and Azalia modes, it will be recognized that the DAA techniques provided herein may also be utilized for providing a DAA that is programmable to operate with other interface standards.

In one embodiment, the programmable interface circuitry 164 may be programmed to a specific desired interface standard by detecting the frequency of the clock signal provided from the system to the DAA. For example, in a typical AC-97 mode of operation, the clock provided by the system to the DAA 100 is often at 12.288 MHZ, 14.31818 MHZ or 24.576 MHZ. Most typically, if the clock provided from an AC-97 based system is at 12.288 or 14.31818 MHZ, then the clock is provided via clock line 122. Alternatively, a clock signal provided at 24.576 MHZ may most typically be provided at the Xin and Xout lines 125 and 127. However, in a typical Azalia mode of operation, the clock provided by the system to the DAA 100 is often a 24.000 MHZ signal provided on the clock line 122. Thus, as shown in FIG. 3, a clock detect circuit 160 may be provided. The clock detect circuit 160 may be coupled to clock lines 122, 125 and 127 to detect the frequency and/or source of the incoming clock signal. If the source of the clock is the crystal oscillator 124 and/or a frequency of 12.288 MHZ, 14.31818 MHZ or 24.576 MHZ is detected by the clock detect circuitry 160, the system side circuitry 102 may then recognize that it is being utilized in an AC-97 standard based system. However, if the clock detect circuitry 160 detects a clock frequency of 24.000 MHZ, then the system side circuitry 102 may recognize that it is being utilized in an Azalia standard based system. The clock detect circuitry 160 may provide a mode select signal through line(s) 162 to the programmable interface 164 for setting the programmable interface to operate in accordance with the appropriate interface standard based upon the clock information presented to the system side circuitry 102.

In this manner, a single system side circuitry 102 of a DAA 100 may be constructed to operate in plurality of interface modes. Thus, separate dedicated parts need not be provided for each mode of operation. Rather, one common DAA system 100 having the same system side circuitry 102 may be utilized independent of what type of communication interface standard the system in which the DAA is placed operates in accordance with. The system side circuitry 102 may in operation automatically detect what type of system the DAA 100 is being utilized within and switch the interface circuitry of the system side circuitry 102 accordingly.

In yet another embodiment, the system side circuitry 102 may determine what type of system interface standard that is being utilized based upon the data contained within the communication interface 116. Thus, as a particular interface standard may have its own data format, synchronization protocols, framing protocols, etc., the system side circuitry 102 may monitor the information presented on the communication interface lines 120 to directly determine what type of interface standard is being utilized and then switch the interface circuitry of the system side circuitry accordingly.

Figure 4:
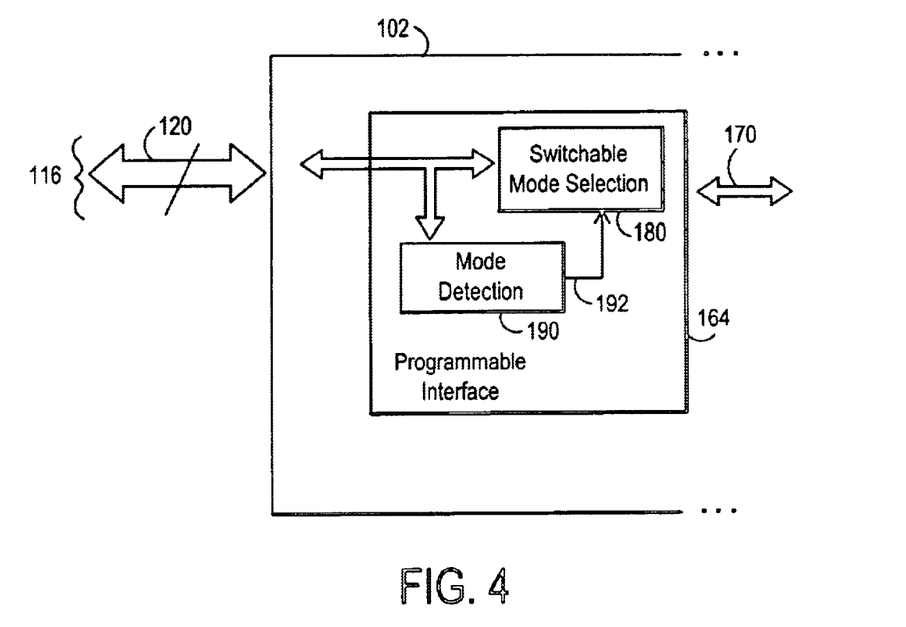
FIG. 4 is a block diagram of a DAA system side circuit having circuitry to select an interface standard based upon data presented at the communication interface.

FIG. 4 illustrates operations of system side circuitry 102 in which the interface standard is determined from the information presented on the communication interface lines 120. As shown in FIG. 4, the programmable interface 164 receives information from the communication interface lines 120. A mode detection circuit 190 detects what interface standard is being utilized based upon at least one characteristic of the information carried on the communication interface lines 120. The mode detection circuit 190 provides a mode signal on line(s) 192 to switchable mode selection circuit 180 for configuring the programmable interface 164 to operate in accordance with the desired interface standard mode.

In one embodiment, the mode detection circuit 190 may be utilized to detect whether the system side circuitry 102 is being utilized in an AC-97 or Azalia interface standard system. For example, both the AC-97 and Azalia interface standards utilize a five wire interface having a RESET, SYNC, BIT_CLK, SDATA_IN, and SDATA_OUT line. The RESET signal is a hardware reset signal. The SYNC signal is a data framing signal that is used to identify data communication frames. The BIT_CLK signal controls data on the SDATA_IN line and latches data on SDATA_OUT line. The SDATA_IN line provides data from the DAA 100 to the host system 114. The SDATA_OUT line provides data from the host system 114 to the DAA 100. More details regarding the AC-97 and Azalia standards may be found in the AC-97 Specification and the Azalia Specification as noted above.

Figure 5:
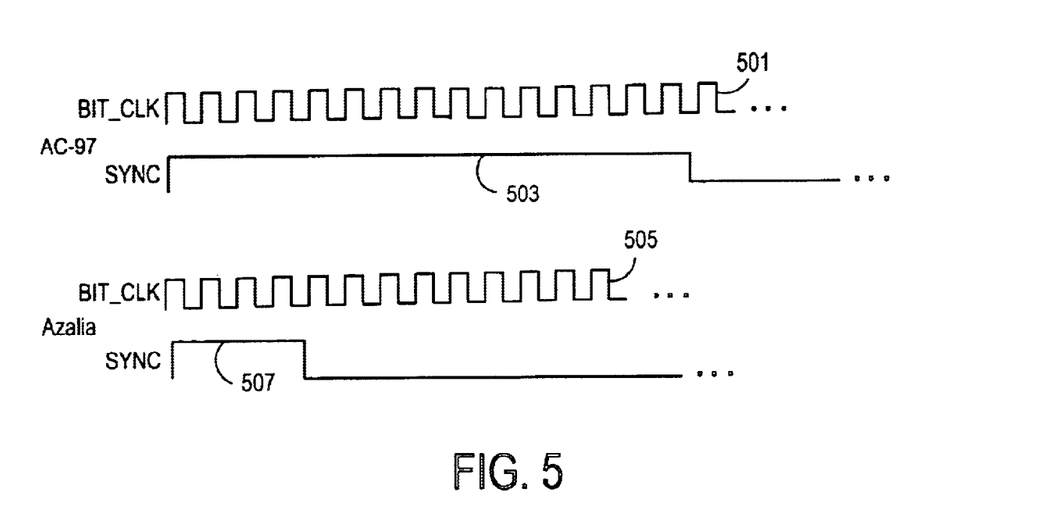
FIG. 5 is a timing diagram illustrating differences between the AC-97 and Azalia interface standards.

FIG. 5 provides more detail regarding the relationship of the SYNC signal and BIT_CLK signal in the AC-97 and Azalia standards. As can be seen in FIG. 5, sixteen pulses of the BIT_CLK signal 501 occur during the assertion of the SYNC signal 503 when operating in accordance with the AC-97 standard. However, when operating under the Azalia standard, four pulses of the BIT_CLK signal 505 occur during the assertion of the SYNC signal 507.

In accordance with the techniques describe herein, a programmable interface may be set to either an AC-97 or Azalia mode by monitoring the number of BIT_CLK pulses during the assertion of the SYNC signal. In this exemplary technique, information provided on the SYNC and BIT_CLK lines is utilized to set the interface standard mode of the system side circuit 102. Thus, the mode detection circuitry 190 of FIG. 4 may monitor the SYNC and BIT_CLK lines to determine which standard the system is operating in accordance with. It will be recognized that the selection of modes between an AC-97 and Azalia mode and the use of the SYNC and BIT_CLK signals for the selection is exemplary and other standards and other signal lines may be utilized to achieve the techniques described herein.

Figure 6:
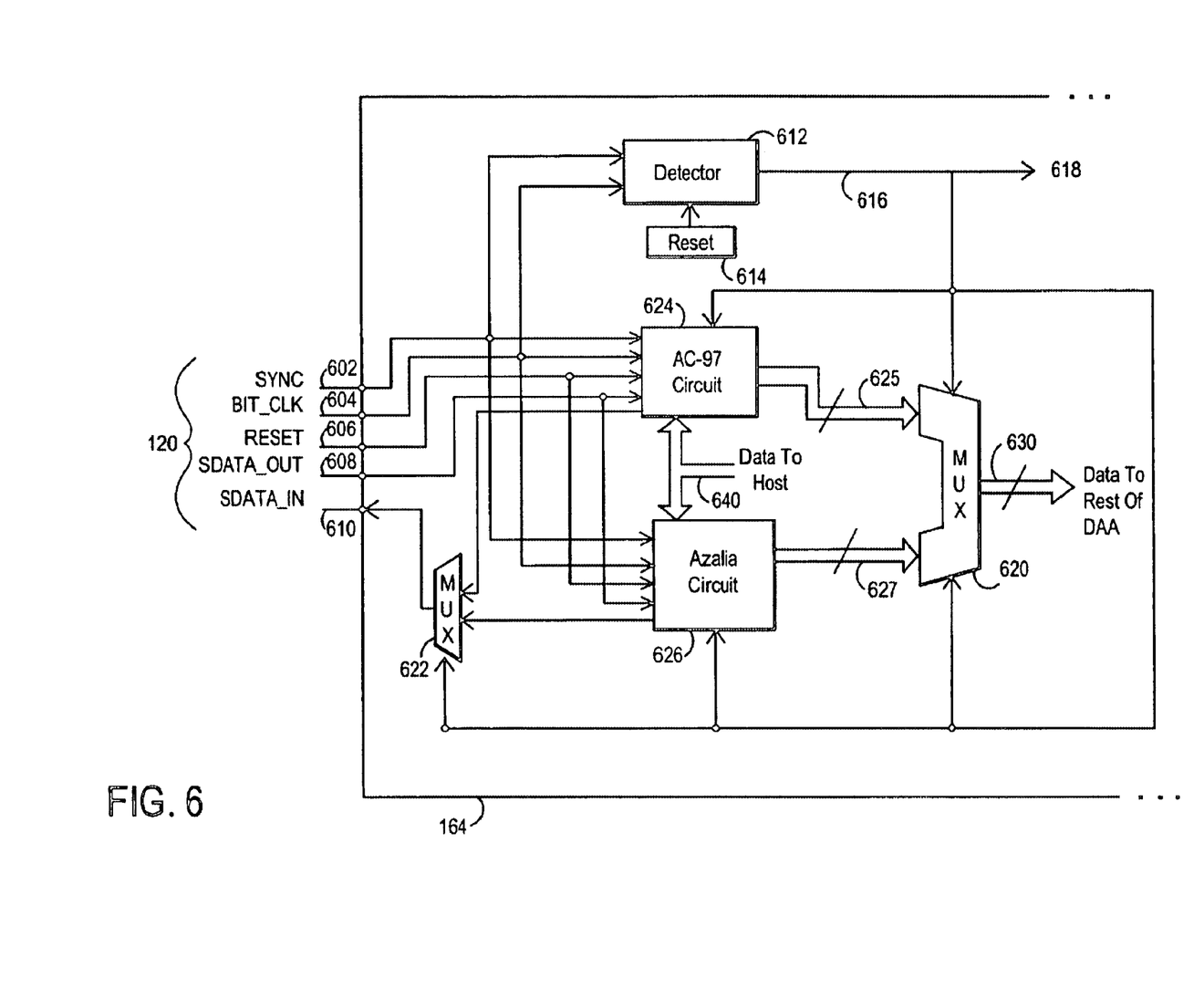
FIG. 6 is a block diagram of a programmable interface of a DAA system side circuit for selecting between the AC-97 and the Azalia interface standards.

One embodiment of a programmable interface 164 for use in system side circuitry 102 of a DAA 100 for selection between an AC-97 and Azalia operating mode is shown in FIG. 6. As shown in FIG. 6, the communication interface lines 120 (comprising the SYNC line 602, BIT_CLK line 604, RESET line 606, SDATA_OUT line 608, and SDATA_IN line 610) are provided to the programmable interface 164. More particularly, the communication interface lines 120 are provided to an AC-97 circuit 624 and an Azalia circuit 626. The AC-97 circuit 624 may include serial to parallel converter circuitry to change the serial information contained on the SDATA_OUT line 608 to parallel information on parallel bus 625. Thus, the AC-97 circuit 624 may extract the AC-97 field, data, and control information and present this information on the parallel bus 625. Likewise, the Azalia circuit 626 may extract the serial Azalia based information and present it on the parallel bus 627. Information that is being provided from the host system 114 through the programmable interface 164 to the rest of the DAA 100 is provided on bus 630.

The AC-97 circuit 624 and the Azalia circuit 626 may also receive information that is to be communicated from the DAA 100 to the host system 114. This information is provided on bus 640 and is converted to the appropriate serial format by either the AC-97 circuit 624 or the Azalia circuit 626 which provide the serial data through multiplexer 622 to the SDATA_IN line 610.

A detector 612 is coupled to the SYNC line 602 and the BIT_CLK line 604. The detector 612 counts the number of pulses of the BIT_CLK signal during an assertion of the SYNC line 602 to determine if the system is an AC-97 or Azalia based system. An output line 616 provides an output signal from the detector 612 that is indicative of whether the communication interface standard is AC-97 or Azalia. On initial start up, a power on reset circuit 614 selects a desired default standard, for example the Azalia standard. Then, if the detector 612 detects AC-97 conditions, an output on signal line 616 may change to indicate AC-97 operations. The output of the detector 612 may be provided to multiplexer 620. Multiplexer 620 selects between the AC-97 based information on bus 625 or the Azalia based information on bus 627 and provides on bus 630 either the AC-97 based information or the Azalia based information to the rest of the DAA based upon the detector output signal on output line 616. Similarly, the output of detector 614 may be provided to multiplexer 622 which selects between AC-97 based information or Azalia based information to provide to the host system 114 on the SDATA_1N line 610, again based upon the detector output signal on output line 616. The output line 616 may also be provided to other circuits within the DAA that may change depending upon whether AC-97 or Azalia operations are desired. For example, PLLs which generate internal clocks within the system side circuitry 102 from the externally provided clock signals (which will vary in frequency depending upon which interface standard is utilized) may be coupled to the output line 616 so as to receive the detector output signal. In addition, various system side registers may be set depending upon the mode of operation indicated by the detector output.

The AC-97 circuit 624 and the Azalia circuit 626 may also be coupled to the detector output signal on output line 616. If AC-97 data is indicated by the detector output signal, the Azalia circuit 626 may be held off. If Azalia data is indicated by the detector output signal, the AC-97 circuit 624 may be held off. In an alternative embodiment, the AC-97 circuit 624 and the Azalia circuit 626 may be combined in one programmable circuit that may perform the serial to parallel conversion for both interface standards. In such an approach, the circuit may be programmably set to process the incoming serial data according to the desired interface standard format and provide a parallel output on an output bus. Similarly, the circuit may be programmably set to convert parallel data presented on bus 640 to the desired interface standard format for presentation to the SDATA_IN line 610. In such an approach multiplexers 620 and 622 may not be required. It will be recognized that the techniques described herein may be implemented with a wide range of circuit arrangements and may apply to a wide range of interface standards.

Further modifications and alternative embodiments of this invention will be apparent to those skilled in the art in view of this description of the invention. Accordingly, this description teaches those skilled in the art the manner of carrying out the invention and are to be construed as illustrative only. The forms of the invention shown and described should be taken as the presently preferred embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

We claim:

1. A method for configuring a direct access arrangement circuit, the direct access arrangement circuit capable of coupling a host system to a telephone line while providing isolation between the host system and the phone line, the method comprising:

providing a plurality of inputs to the direct access arrangement circuit, at least one of the inputs being a digital communication interface input;

providing a programmable digital interface within the direct access arrangement circuit, the programmable digital interface allowing for communication between the direct access arrangement circuit and the host system, the programmable digital interface being operable to operate in accordance with a plurality of interface standards; and configuring the direct access arrangement circuit to automatically select at least one of the interface standards based upon at least one signal presented at at least one of the plurality of inputs, wherein the at least one signal has characteristics associated with a host system operating in accordance with at least one of the plurality of interface standards.

2. The method of claim 1 wherein the at least one signal is provided from a clock source.

3. The method of claim 2 wherein the clock source is a crystal oscillator.

4. The method of claim 2 wherein the clock source is clock line.

5. The method of claim 2 wherein the interface standards include at least the AC-97 standard.

6. The method of claim 2 wherein the interface standards include at least the Azalia standard.

7. The method of claim 2 wherein the interface standards include at least the AC-97 standard and the Azalia standard.

8. The method of claim 1 wherein the at least one signal is provided on at least one communication interface line.

9. The method of claim 8 wherein the interface standards includes at least the AC-97 standard.

10. The method of claim 9 wherein the at least one signal is comprised of at least two signals, the signals provided on the BIT_CLK and SYNC lines.

11. The method of claim 8 wherein the interface standards includes at least the Azalia standard.

12. The method of claim 11 wherein the at least one signal is comprised of at least two signals, the signals provided on the BIT_CLK and SYNC lines.

13. The method of claim 8 wherein the interface standards include at least the AC-97 standard and the Azalia standard.

14. The method of claim 13 wherein the at least one signal is comprised of at least two signals, the signals provided on the BIT_CLK and SYNC lines.

15. A method for operating a direct access arrangement circuit, the direct access arrangement circuit capable of coupling a host system to a telephone line while providing isolation between the host system and the phone line, the method comprising:

providing a programmable digital interface within the direct access arrangement circuit, the programmable digital interface capable of operating in accordance with a plurality of interface standards;

automatically detecting the operating interface standard that the host system is operating in accordance with by detecting a characteristic of the operating interface standard within information presented by the host system to at least one of the inputs of the direct access arrangement circuit.

16. The method of claim 15 wherein the detected characteristic is a clock frequency.

17. The method of claim 16 wherein at least one of the interface standards is the AC-97 standard.

18. The method of claim 16 wherein at least one of the interface standards is the Azalia standard.

19. The method of claim 8 wherein the interface standards include at least the AC-97 standard and the Azalia standard and either the AC-97 standard or the Azalia standard is selected based upon a detected clock frequency.

20. The method of claim 15 wherein the detected characteristic is a characteristic provided for in one or more communication interface lines.

21. The method of claim 20 wherein the detected characteristic is detected on at least a BIT_CLK and a SYNC communication interface line.

22. The method of claim 20 wherein at least one of the interface standards is the AC-97 standard.

23. The method of claim 20 wherein at least one of the interface standards is the Azalia standard.

24. The method of claim 20 wherein the interface standards include at least the AC-97 standard and the Azalia standard.

25. The method of claim 24 wherein the detected characteristic is detected on at least a BIT_CLK and a SYNC communication interface line.

26. A method for configuring a circuit, the circuit interfacing with a host system through a communication interface, the communication interface being compatible with at least one of the AC-97 standard or the Azalia standard, the method comprising:

providing a plurality of inputs to the circuit, at least one of the inputs being a digital communication interface input;

providing a programmable digital interface within the circuit, the programmable digital interface allowing for communication between the circuit and the host system, the programmable digital interface being operable to operate in accordance with a plurality of interface standards, at least one of the interface standards being the AC-97 standard or the Azalia standard; and configuring the circuit to automatically select at least one of the interface standards based upon at least one signal presented at at least one of the plurality of inputs, wherein the at least one signal has characteristics associated with a host system operating in accordance with at least one of the plurality of interface standards.

27. The method of claim 26 wherein the at least one signal is provided from a clock source.

28. The method of claim 27 wherein the clock source is a crystal oscillator.

29. The method of claim 27 wherein the clock source is clock line.

30. The method of claim 27 wherein the interface standards include at least the AC-97 standard.

31. The method of claim 27 wherein the interface standards include at least the Azalia standard.

32. The method of claim 27 wherein the interface standards include at least the AC-97 standard and the Azalia standard.

33. The method of claim 26 wherein the at least one signal is provided on at least one communication interface line.

34. The method of claim 33 wherein the interface standards includes at least the AC-97 standard.

35. The method, of claim 34 wherein the at least one signal is comprised of at least two signals, the signals provided on the BIT_CLK and SYNC lines.

36. The method of claim 33 wherein the interface standards includes at least the Azalia standard.

37. The method of claim 36 wherein the at least one signal is comprised of at least two signals, the signals provided on the BIT_CLK and SYNC lines.

38. The method of claim 33 wherein the interface standards include at least the AC-97 standard and the Azalia standard.

39. The method of claim 38 wherein the at least one signal is comprised of at least two signals, the signals provided on the BIT_CLK and SYNC lines.

40. A direct access arrangement circuit that is configured to provide communications between a host system and a telephone line while providing telephone line isolation between the host system and the telephone line, the direct access arrangement circuit comprising:
 a plurality of input nodes;
 a programmable interface circuit, the programmable interface circuit coupled to at least one of the input nodes, the programmable interface circuit configured to be selectable to operate in accordance with a plurality of interface standards;
 a detection circuit coupled to at least one of the input nodes and to the programmable interface circuit, the detection circuit automatically identifying characteristics of at least one of the interface standards on at least one of the input nodes and providing a mode selection signal to the programmable interface circuit based upon the identification of the interface standard.

41. The direct access arrangement circuit of claim 40 wherein the identified characteristic is clock information provided at on at least one clock source node.

42. The direct access arrangement circuit of claim 41 wherein at least one of the interface standards is the AC-97 standard.

43. The direct access arrangement circuit of claim 41 wherein at least one of the interface standards is the Azalia standard.

44. The direct access arrangement circuit of claim 41 wherein the interface standards include at least the AC-97 standard and the Azalia standard, and either the AC-97 standard or the Azalia standard is selected based upon a detected clock frequency.

45. The direct access arrangement circuit of claim 40 wherein the identified characteristic is a characteristic presented on an input node that is coupled to communication interface lines that operate in accordance with at least one of the interface standards.

46. The direct access arrangement circuit of claim 45 wherein at least one of the interface standards is the AC-97 standard.

47. The direct access arrangement circuit of claim 45 wherein at least one of the interface standards is the Azalia standard.

48. The direct access arrangement circuit of claim 45 wherein the interface standards include at least the AC-97 standard and the Azalia standard, and either the AC-97 standard or the Azalia standard is selected based upon characteristics detected on the BIT_CLK and SYNC lines.

* * * * *